Patented Nov. 11, 1947

2,430,722

UNITED STATES PATENT OFFICE 2,430,722

DERIVATIVES OF CHLORINATED QUINONES AS FUNGICIDES

Elbert C. Ladd and Merlin P. Harvey, Passaic, N. J., assignors to United States Rubber Company, New York, N. Y., a corporation of New Jersey No Drawing. Application April 25, 1946, Serial No. 664,990

10 Claims. (Cl. 167—30)

This invention relates to new and useful improvements in fungicides. The invention further relates to methods of treating plants, and to methods of protecting organic material subject to attack by fungi, as the immunizing of seed, and the mildewproofing of fabrics and other material.

Tetrachloro-para-benzoquinone and 2,3-dichloro-1,4-naphthoquinone are known fungicides (ter Horst U. S. Patents 2,349,771 and 2,349,772). We have found that derivatives of tetrachloro-para-benzoquinone and 2,3-dichloro-1,4-naphthoquinone (and the equivalent tetrabrom-para-benzoquinone and 2,3-dibrom-1,4-naphthoquinone) in which a halogen is replaced by the residue obtained by removing a hydrogen from a compound containing an active methylene group, e. g. oxalacetic esters, acetoacetic esters, malonic esters, malononitrile and α-cyanoacetic esters, are effective fungicides. The compounds may be formed by reacting the halogenated quinone with the sodium derivative of the compound containing the active methylene group in known manner. In this type of reaction the halogen of the quinone is eliminated as sodium halide. For example, 3,5,6-trichloro-1,4-benzoquinone-2-oxalacetic acid, diethyl ester was prepared as follows: 31.5 g. (0.15 mol) of solid sodium diethyl oxalacetate was added slowly with stirring to a suspension of 12.29 g. (0.05 mol) of 2,3,5,6-tetrachloro benzoquinone-1,4 in 300 ml. of acetone. The mixture was allowed to stand at room temperature for 1½ hours. The resultant deep blue colored solution was then filtered and acidified with concentrated hydrochloric acid. The solution was then diluted with about 1½ times its volume of water whereupon a yellow oil separated. The yellow oil crystallized to a greenish yellow solid after standing for a few hours. The solid was filtered off, washed thoroughly with water, and air dried. The solid was recrystallized from ethanol whereupon a light yellow solid having an M. P. of 102–103.5° C. was obtained. The yield was 11.4 g.; percent chlorine, found 26%; calculated for $C_{14}H_{11}O_7Cl_3$, 26.77%.

Similar compounds may be prepared by reacting the halogenated quinone with sodium acetoacetic esters, sodium malonic esters, sodium malononitrile, and sodium α-cyanoacetic esters. For example, 2-chloro-1,4-naphthoquinone-3-oxalacetic acid, diethyl ester and α-acetyl-3-chloro-1,4-naphthoquinone-2-acetic acid, ethyl ester, and methods of preparing the same, are described by Michel in Berichte 33, page 2404 (1900), and α-acetyl-3,5,6-trichloro-1,4-benzoquinone-2-acetic acid, ethyl ester and a method of preparing it are described by Ikuta in Beilstein, 4th edition, 10, page 860.

The compounds may be used as seed protectants, and to protect plants, which term includes plant parts, or soil from microorganisms harmful to seeds and plants. They may also be applied to prevent or retard fungus growth and the formation of, for example, mildew on organic material such as rope, wood, fur, hair, feathers, cotton, wool, leather, paints, varnishes and the like. They may be applied as a dust, undiluted or mixed with a powdered solid carrier, such as clay or talc, or as a liquid or a spray in a liquid carrier, as in solution in a suitable solvent, or suspended in a suitable non-solvent, for example, water. Preferably when applied from solution or suspension in a liquid carrier, the composition contains a surface-active agent which acts as a wetting or dispersing agent for the chemicals. They may be applied as to foliage by the aerosol method. Solutions for the aerosol treatment may be prepared by dissolving the chemical directly in the highly volatile liquid carrier or first dissolving the chemical in a less volatile solvent and then admixing such solution with the highly volatile liquid aerosol carrier. The compounds may be used admixed with carriers that are active of themselves, for example, other fungicides, or bactericides, insecticides, insectifuges, fertilizers, hormones, buffering or softening agents.

The following examples are given to illustrate the invention:

Example I

Pea seed (variety Perfection) were tumbled with different percentages by weight in dust form of 2-chloro-1,4-naphthoquinone - 3-oxalacetic acid, diethyl ester. The seeds were then planted in greenhouse soil known to be infested with a number of fungus species harmful to seeds and plants, including *Pythium ultimum*. In each case an equivalent number of untreated seeds were planted at the same time. The effectiveness of the chemicals in the following dosages as a fungicide was determined by comparing, 10 days after planting, the percentage of treated and untreated seeds which germinated and grew (% stand). The results are shown in the following table:

| Chemical | Dosage in per cent Seed Wgt. | Per cent Stand after 10 Days | |
| --- | --- | --- | --- |
| | | Treated | Untreated |
| 2-chloro-1,4-naphtho-quinone-3-oxalacetic acid, diethyl ester | 1.0 | 83 | 14 |
| Do | 0.125 | 60 | 11 |

*Example II*

The toxicity of the chemicals of the invention to the spores of the fugus *Sclerotinia fructicola* was measured according to the methods described by S. E. A. McCallan et al. in Contributions Boyce Thompson Institute 4, 233 (1932); 9, 249 (1938); 10, 329 (1939); 12, 49 (1941); 12, 431 (1942). Various concentrations of the different chemicals in water, defined as parts per million (P. P. M.), were tested using the "slide technique" described in the above references. The percent kill of the fungus, designated as "Ungerminated spores (%)," are shown in the following table:

| Chemical | Conc. of Chem. (P.P.M.) | Ungerminated Spores (per cent) | |
| --- | --- | --- | --- |
| | | Treated | Untreated |
| 2-chloro-1,4-naphthoquinone-3-oxalacetic acid, diethyl ester | 5 | 100 | 0 |
| | 1 | 82 | 6 |
| α-acetyl-3,5,6-trichloro-1,4-benzoquinone-2-acetic acid, ethyl ester | 5 | 100 | 0 |
| α-acetyl-3-chloro-1,4-naphthoquinone-2-acetic acid, ethyl ester | 5 | 100 | 0 |
| | 4 | 88 | 2 |
| 3,5,6-trichloro-1,4-benzoquinone-2-oxalacetic acid, diethyl ester | 5 | 100 | 0 |

Having thus described our invention, what we claim and desire to protect by Letters Patent is:

1. A fungicidal composition comprising as an active ingredient a derivative of a chlorinated quinone selected from the group consisting of tetrachloro-parabenzoquinone and 2,3-dichloro-1,4-naphthoquinone in which a chlorine atom is substituted by the residue obtained by removing a hydrogen from the active methylene group of a compound selected from the group consisting of oxaloacetic esters, acetoacetic esters, malonic esters, malononitrile, and α-cyanoacetic esters, said fungicidal composition containing a carrier selected from the group consisting of powdered solid carriers, and water containing a dispersing agent.

2. A fungicidal composition comprising a powdered solid carrier and as an active ingredient a derivative of a chlorinated quinone selected from the group consisting of tetrachloro-para-benzoquinone and 2,3 - dichloro - 1,4 - naphthoquinone in which a chlorine atom is substituted by the residue obtained by removing a hydrogen from the active methylene group of a compound selected from the group consisting of oxaloacetic esters, acetoacetic esters, malonic esters, malononitrile, and α-cyanoacetic esters.

3. A fungicidal composition comprising an aqueous suspension of a derivative of a chlorinated quinone selected from the group consisting of tertachloro-para-benzoquinone and 2,3-dichloro-1,4-naphthoquinone in which a chlorine atom is substituted by the residue obtained by removing a hydrogen from the active methylene group of a compound selected from the group consisting of oxaloacetic esters, acetoacetic esters, malonic esters, malononitrile, and α-cyanoacetic esters, said aqueous suspension containing a dispersing agent.

4. The method of protecting organic material subject to attack by micro organisms which comprises treating said organic material with a derivative of a chlorinated quinone selected from the group consisting of tetrachloro-para-benzoquinone and 2,3-dichloro-1,4-naphthoquinone in which a chlorine atom is substituted by the residue obtained by removing a hydrogen from the active methylene group of a compound selected from the group consisting of oxaloacetic esters, acetoacetic esters, malonic esters, malononitrile, and α-cyanoacetic esters.

5. The method of controlling fungi on plants which comprises treating the plants with a derivative of a chlorinated quinone selected from the group consisting of tetrachloro-para-benzoquinone and 2,3 - dichloro - 1,4 - naphthoquinone in which a chlorine atom is substituted by the residue obtained by removing a hydrogen from the active methylene group of a compound selected from the group consisting of oxaloacetic esters, acetoacetic esters, malonic esters, malononitrile, and α-cyanoacetic esters.

6. The method of protecting seeds, plants and soil subject to attack or infestation by fungi which comprises treating said material with a derivative of a chlorinated quinone selected from the group consisting of tetrachloro-para-benzoquinone and 2,3-dichloro-1,4-naphthoquinone in which a chlorine atom is substituted by the residue obtained by removing a hydrogen from the active methylene group of a compound selected from the group consisting of oxaloacetic esters, acetoacetic esters, malonic esters, malononitrile, and α-cyanoacetic esters.

7. The method of immunizing seed which comprises treating said seed with a derivative of a chlorinated quinone selected from the group consisting of tetrachloro-para-benzoquinone and 2,3-dichloro-1,4-naphthoquinone in which a chlorine atom is substituted by the residue obtained by removing a hydrogen from the active methylene group of a compound selected from the group consisting of oxaloacetic esters, acetoacetic esters, malonic esters, malononitrile, and α-cyanoacetic esters.

8. The method of controlling fungi on living organisms which comprises treating said organisms with a derivative of a chlorinated quinone selected from the group consisting of tetrachloro-para-benzoquinone and 2,3-dichloro-1,4-naphthoquinone in which a chlorine atom is substituted by the residue obtained by removing a hydrogen from the active methylene group of a compound selected from the group consisting of oxaloacetic esters, acetoacetic esters, malonic esters, malononitrile, and α-cyanoacetic esters.

9. The method of destroying fungus which comprises subjecting said fungus to the action of a derivative of a chlorinated quinone selected from the group consisting of tetrachloro-para-benzoquinone and 2,3-dichloro-1,4-naphthoquinone in which a chlorine atom is substituted by the residue obtained by removing a hydrogen from the active methylene group of a compound selected from the group consisting of oxaloacetic esters, acetoacetic esters, malonic esters, malononitrile, and α-cyanoacetic esters.

10. The method of controlling mildew on organic material which comprises treating said organic material with a derivative of a chlorinated quinone selected from the group consisting of tetrachloro-para-benzoquinone and 2,3-dichloro-1,4-naphthoquinone in which a chlorine atom is substituted by the residue obtained by removing a hydrogen from the active methylene group of a compound selected from the group consisting of oxaloacetic esters, acetoacetic esters, malonic esters, malononitrile, and α-cyanoacetic esters.

ELBERT C. LADD.
MERLIN P. HARVEY.

REFERENCES CITED

The following references are of record in the file of this patent:

UNITED STATES PATENTS

| Number | Name | Date |
|---|---|---|
| 2,288,198 | Langbein | June 30, 1942 |
| 2,349,771 | Ter Horst | May 23, 1944 |
| 2,349,772 | Ter Horst | May 23, 1944 |

OTHER REFERENCES

Berichte der Deuschen Chemischen Gesellschaft, volume 33 (1900), pages 2404 and 2405, by Michel.

Beilstein, 4th edition, vol. 10 (1927), page 860.